United States Patent [19]
Brown et al.

[11] Patent Number: 5,897,131
[45] Date of Patent: Apr. 27, 1999

[54] COLLAPSIBLE, GROUND-SUPPORTABLE TRANSPORT CARRIER

[76] Inventors: Irvin Richard Brown, 4291 Fern Canyon Pl., Ukiah, Calif. 95482; Terry Dennis Brown, 728 Brooksview Ct., Martinez, Calif. 94553; David Leo Cochran, 472 Constitution Dr., Danville, Calif. 94526; Henry E. Reinstein, 8201 Highland Rd., Livermore, Calif. 94550

[21] Appl. No.: 08/694,306

[22] Filed: Aug. 8, 1996

[51] Int. Cl.⁶ .................................................. B62B 13/18
[52] U.S. Cl. .................. 280/7.12; 280/28.12; 280/47.19
[58] Field of Search ................... 280/638, 640, 280/641, 42, 652, 656, 47.131, 47.17, 47.18, 47.19, 47.21, 47.26, 47.315, 18, 20, 24, 28, 28.12, 7.12, 7.14, 8, 9; 220/4.26, 4.27, 4.34; 180/906

[56] References Cited

U.S. PATENT DOCUMENTS

| | | | |
|---|---|---|---|
| 2,257,536 | 9/1941 | Roycroft | 220/4.26 |
| 2,398,299 | 4/1946 | Frandsen | 220/4.26 |
| 2,469,765 | 5/1949 | Fish | 280/18 |
| 2,627,422 | 2/1953 | Pagelkopf | 280/20 |
| 2,914,210 | 11/1959 | Paston | 220/4.26 |
| 3,087,740 | 4/1963 | Mitty et al. | 280/47.131 |
| 3,105,698 | 10/1963 | Bonarrigo et al. | 280/47.131 |
| 3,223,430 | 12/1965 | Fitzsimmons | 280/42 |
| 3,726,535 | 4/1973 | Longato | 280/47.18 |
| 4,040,643 | 8/1977 | Applequist et al. | 280/656 |
| 4,239,247 | 12/1980 | Hinz | 280/24 |
| 4,796,909 | 1/1989 | Kirkendall | 180/906 |
| 5,480,180 | 1/1996 | Fuller et al. | 280/656 |

FOREIGN PATENT DOCUMENTS 219989  3/1985  Germany ............................. 280/47.18

*Primary Examiner*—J. J. Swann
*Assistant Examiner*—Frank Vanaman
*Attorney, Agent, or Firm*—Burns, Doane, Swecker & Mathis, L.L.P.

[57] ABSTRACT

A collapsible, ground-supportable, manually transportable carrier includes a container and transport handles attached to a front end of the container. The container is formed of a plurality of detachable container sections, with adjacent sections being interconnected by a transverse hinge extending along floor portions of the container sections. The hinge comprises hinge elements inter-fitted together and rotatable relative to one another to a position enabling the container sections to be detached from one another. Tensioned cables extend along upper edges of the carrier side wall to oppose pivoting of the hinge elements and thereby maintain the container sections interconnected. The carrier can be ground-supported directly on a floor of a rear container section, or ground-support wheels can be mounted on that rear container section. The container sections, when disassembled, can be nested together, one inside of the other.

19 Claims, 4 Drawing Sheets

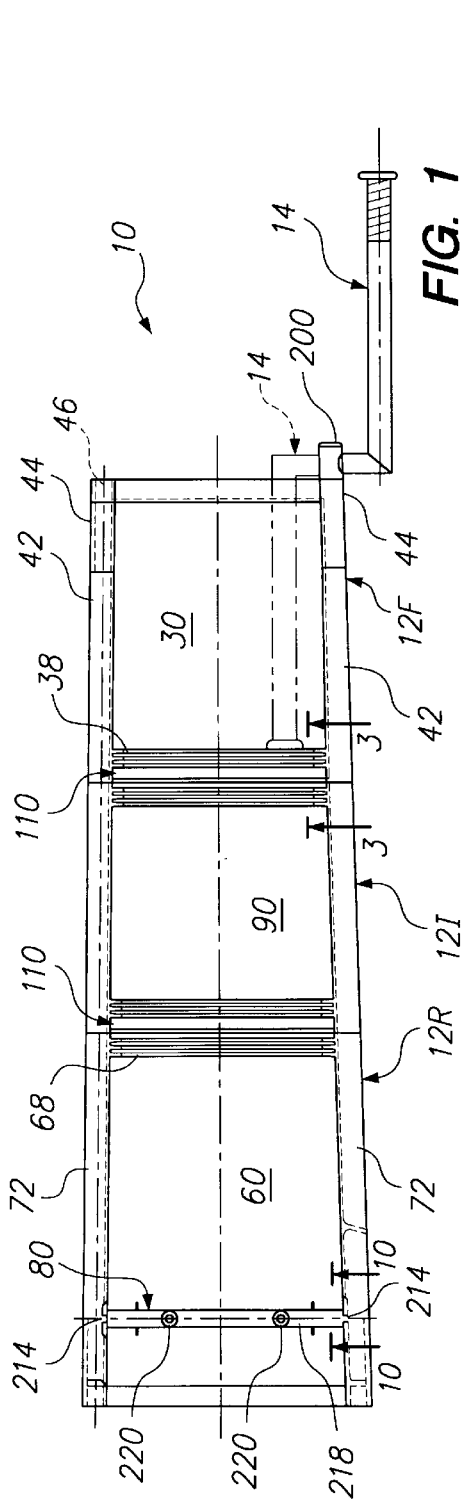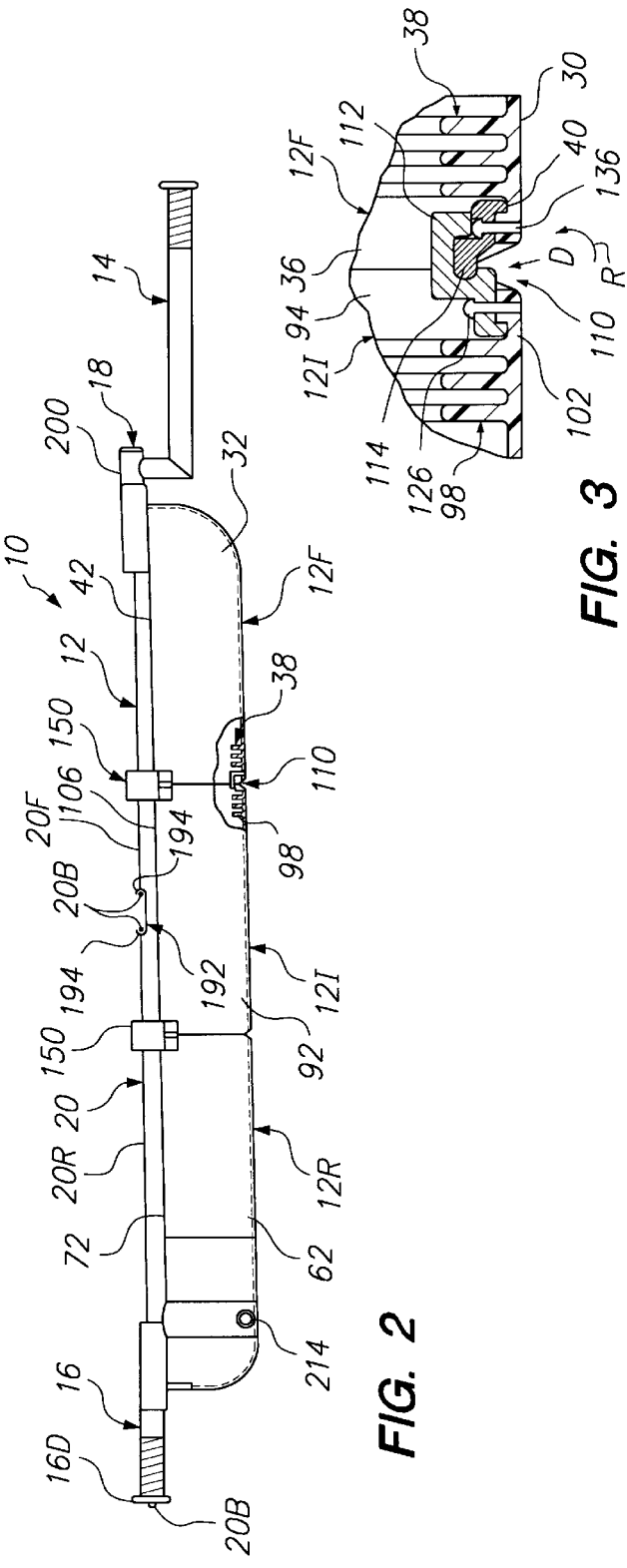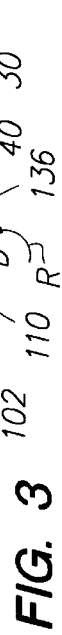

COLLAPSIBLE, GROUND-SUPPORTABLE TRANSPORT CARRIER

BACKGROUND OF THE INVENTION

The present invention relates to a collapsible, ground-supported, manually transported carrier.

It may be desirable when traveling on foot in relatively remote areas, e.g., when hiking, hunting, cross-country skiing, etc., to possess a ground-supportable carrier, e.g., wheel-supported or runner-supported (i.e., a sled type of carrier), capable of supporting heavy loads. For example, such a carrier could serve to transport large game killed by a hunter, or as a stretcher for an injured person. The carrier should be collapsible to a compact state for easier handling when not in use.

Collapsible, ground-supportable, manually transportable carriers are disclosed, for example, in U.S. Pat. Nos. 2,314,293; 2,316,456; 2,667,996; and 3,104,116. It is desirable that such structures be easy to assemble and collapse while yet being strong and rugged when assembled. On the other hand, the structure should be as light-weight as possible in order to facilitate transport when not in use. Among the shortcomings presented by the prior art is an excessive number of components, including screws, bolts, nuts, etc., whose assembly is time consuming and difficult. Also, in order to provide the requisite strength, relatively thick parts may be employed which are too heavy and/or too large for being conveniently transported.

Therefore, it would be desirable to provide a collapsible, ground-supportable, manually transportable carrier which is strong, rugged, light in weight, and easy to assemble and collapse.

SUMMARY OF THE INVENTION

The present invention relates to a collapsible, ground-supportable, manually transportable carrier. The carrier comprises a container formed by a plurality of container sections. Each container section includes a floor extending from one longitudinal end to another of its respective container section, and a pair of opposing side walls extending upwardly from the floor. The container sections are arranged in end-to-end relationship so that the floors and side walls are contiguously arranged to form an upwardly open space. A connecting structure interconnects adjoining ones of the container sections. The connecting structure includes inter-fitting connector elements disposed on the floors of respective ones of the adjoining container sections. The inter-fitting connector elements are disengageable from one another upon relative movement between the adjoining container sections in a first direction. A tensioned cable arrangement is releasably connected to the container to apply a force to the container sections opposing the relative movement. A cable tensioner is connected to the cable arrangement for adjusting cable tension.

The inter-fitting elements preferably comprise hinge elements forming a horizontal transverse pivot axis between the adjoining container sections. The relative movement for disengaging the hinge elements comprises relative pivotal movement about the pivot axis in a direction causing upper portions of the adjoining container sections to move away from one another. The tensioned cable arrangement extends in a longitudinal direction adjacent upper edges of respective side walls of the adjoining container sections. One of the hinge elements preferably forms a downwardly open recess, and the other of the hinge elements forms a projection sized to fit into the recess. The recess and projection preferably extend transversely across substantially the entire width of their respective container sections.

Preferably, there are at least three container sections arranged end-to-end, with two of the container sections each including an upright end wall defining a longitudinal end of the space.

The container sections are preferably configured to nest one inside of the other when the carrier has been collapsed.

Axles may be removably mounted in a rearmost one of the container sections, with wheels being mountable on respective axles. The axles are shiftable in a transverse direction of the carrier between retracted and extended positions. When the axles are extended, the wheels can be attached thereto so that the carrier is wheel-supported. When the carrier is to be used as a sled, the wheels are removed, and the axles are retracted.

Another aspect of the invention involves a collapsible ground-supportable, manually transportable carrier comprising a container formed by a plurality of detachable container sections, with one of the sections constituting a rearmost container section and including a pair of sockets aligned in a direction transversely relative to a front to rear axis of the container. The carrier further includes a pair of axles each carrying a wheel and being slidably mounted in respective ones of the sockets. The axles are adjustable within their respective sockets in a transverse direction between retracted and extended positions. When the axles are extended, the wheels can be attached thereto so that the carrier is wheel-supported. When the carrier is to be used as a sled, the wheels are removed, and the axles are retracted. Preferably, each axle includes a pair of recesses spaced apart along the axle, and each socket includes a fastener for engaging a selected one of the recesses.

BRIEF DESCRIPTION OF THE DRAWINGS

The objects and advantages of the invention will become apparent from the following detailed description of a preferred embodiment thereof in connection with the accompanying drawing in which like numerals designate like elements and in which:

FIG. 1 is a top plan view of a container formed by detachable container sections according to the present invention, with one handle component attached to the container;

FIG. 2 is a side elevational view of a fully assembled carrier according to the present invention;

FIG. 3 is a cross-sectional view taken along the line 3—3 in FIG. 1;

DETAILED DESCRIPTION OF A PREFERRED EMBODIMENT OF THE INVENTION

Figure 26:
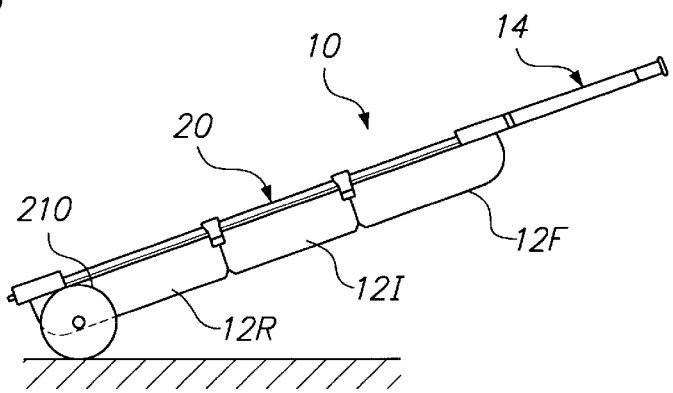
FIG. 26 is a side elevational view of the carrier having ground support wheels and oriented in a position for being transported.

A collapsible carrier 10 which can be supported on the ground for manual transport, is depicted in FIG. 2. The carrier 10 comprises a container 12, a pair of handles 14 (only one shown in FIG. 2), a rear cable anchor 16, a front cable tensioner 18, and a cable arrangement 20. Support wheels 22 (see FIGS. 26, 28) are preferably also provided for optional use.

The container 12 comprises a plurality of container sections, in the depicted embodiment there being three sections, viz., front, intermediate and rear sections 12F, 12I, 12R, respectively. Each of the sections is formed of a strong, yet relatively light-weight material such as RTP Nylon reinforced with 20% glass, for example.

Figure 6:
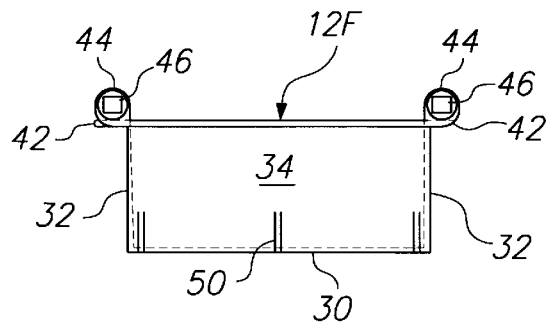
FIG. 6 is a front elevational view of a front container section of the container.
Figure 7:
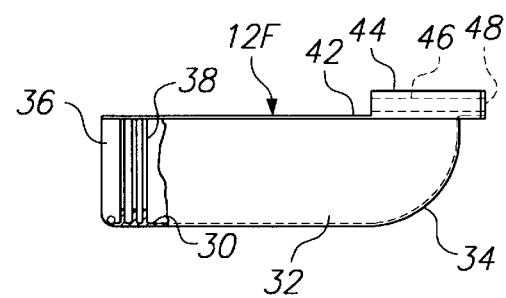
FIG. 7 is a side elevational view of the container section depicted in FIG. 6.

The front section 12F, also depicted in FIGS. 6 and 7, includes a floor 30, a pair of side walls 32 extending upwardly from opposite edges of the floor, and a front wall 34 extending between the side walls 32. The rear end 36 of the section 12F is open. Disposed adjacent the rear end 36 are transverse reinforcing ribs 38 (see also FIG. 3) which extend along the floor transversely of the front to rear direction of the carrier, and also vertically along each of the side walls 32. Three reinforcing ribs are depicted, although any suitable number could be employed. Those reinforcing ribs serve to stiffen the container section against deformation when under load.

A transverse groove 40 is arranged in the floor closely adjacent the rear end 36. That groove 40 functions to receive a hinge element, as will be explained later. The upper edge of each side wall 32 includes a horizontally outwardly projecting flange 42. Disposed at a front end of each of the side walls is a hollow socket member 44 which forms a non-circular, e.g., square, hole 46 extending in a longitudinal, i.e., front to rear, direction. A round counterbore 48 is formed at a front end of the hole 46 (see also FIG. 25). Longitudinal reinforcing ribs 50 are formed on the underside of the floor 30.

Figure 8:
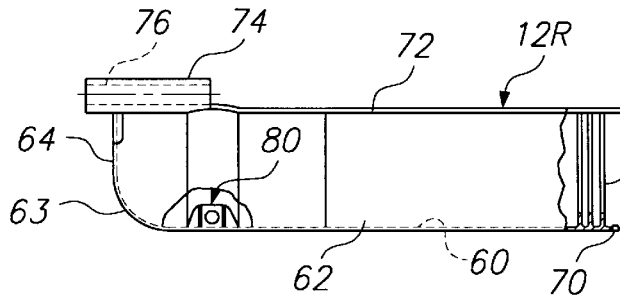
FIG. 8 is a side elevational view of a rear container section of the container, with portions thereof broken away.
Figure 9:
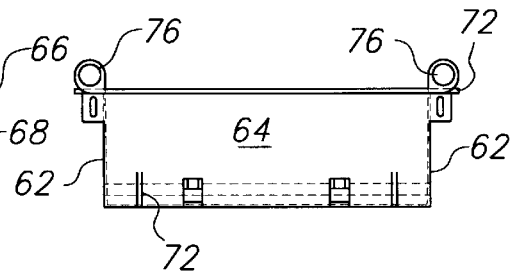
FIG. 9 is a rear elevational view of the container section depicted in FIG. 8.

The rear section 12R, also shown in FIGS. 8 and 9, is of generally similar construction to the front section 12F and is formed of the same material. The rear section includes a floor 60, an upright rear wall 64 extending between the side walls 62, and a convexly curved transition section 63 connecting an underside of the floor to the rear wall 64. A front end 66 of the rear section 12R is open. A transverse reinforcing rib arrangement 68 is provided adjacent the rear end 66, and a transverse groove 70 is formed adjacent the rear end 66. The underside of the floor 60 is provided with longitudinal reinforcing ribs 72. The upper edge of each side wall 62 includes a horizontally outwardly extending flange 72. Disposed at the rear of the top edge of each side wall is a hollow socket member 74 forming a cylindrical through hole 76. The rear section 12R also includes an axle-mounting structure 80 which will be described later.

Figure 23:
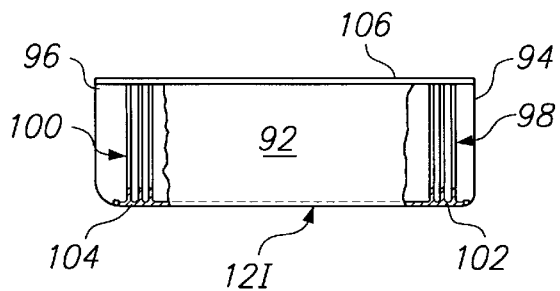
FIG. 23 is a side elevational view of an intermediate container section, with end portions thereof broken away.
Figure 24:
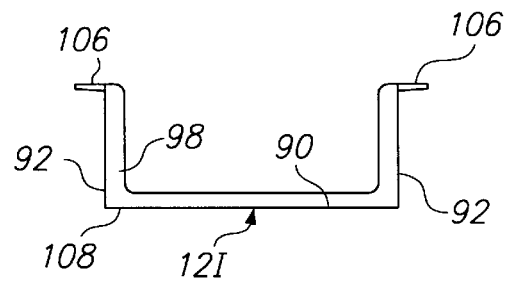
FIG. 24 is an end elevational view of the container section depicted in FIG. 23.

The intermediate container section 12I, also depicted in FIGS. 23 and 24, includes a floor 90, and a pair of side walls 92 extending upwardly from opposite edges of the floor 90. The front and rear ends 94, 96 of the section 12 are open. A transverse reinforcing rib structure 98, 100 is disposed adjacent each of the front and rear ends 94, 96, respectively. Transverse grooves 102, 104 are formed adjacent the front and rear ends (see also FIG. 3 for a depiction of the front groove 102). The upper edge of each side wall 92 includes a horizontally outwardly projecting flange 106. Longitudinal reinforcing ribs 108 are provided on an underside of the floor 90.

Adjacently disposed ones of the container sections are interconnected by a hinge arrangement 110, as depicted in FIGS. 3 and 11–14. The hinge arrangement 110 which interconnects the front and intermediate container sections 12F, 12I is identical to the hinge arrangement 110 which interconnects the rear and intermediate container sections 12R, 12I. Each hinge arrangement includes a female hinge element 112 and a male hinge element 114. The female hinge element 112 forms a downwardly open recess 116 (see FIG. 12), one end of which is in the form of a pocket 118 having a semi-cylindrical surface 120. Formed in the female hinge member 112 is a plurality of vertical holes 122, and a downwardly projecting lip 124 is disposed at one end of the member 112, which fits into the transverse groove 102 of the intermediate section 12I. The holes 122 receive rivets 126 securing the female hinge element 112 to the intermediate section 12I.

The male hinge element includes a horizontally projecting nose 130 (see FIG. 14) of generally semi-cylindrical shape. The male hinge element also includes a plurality of transversely spaced vertical holes 132, and a downwardly projecting lip 134 which fits into the transverse groove 40 of the front section 12F. The male hinge element is secured to the front section 12F by means of rivets 136 extending through the holes 132.

With the hinge elements 112, 114 connected to the respective container sections, those two container sections are joined together by inserting the nose 130 into the slot 116 in an incline direction D shown in FIG. 3 which is inclined obliquely relative to the floor. Then, the front section 12F is rotated relative to the intermediate section in a direction R shown in FIG. 3 (or the intermediate section is rotated in a direction opposite direction R), whereupon the male hinge element becomes nested in the slot 116. This causes the upper edges of the side walls to become contiguously positioned relative to one another.

Figure 4:
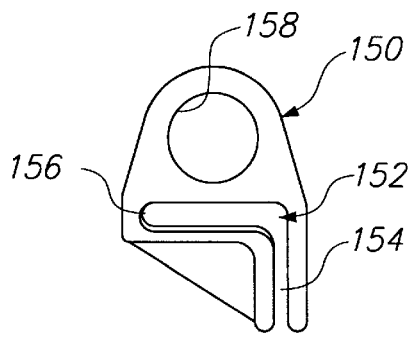
FIG. 4 is an end view of a dowel member according to the present invention.
Figure 5:
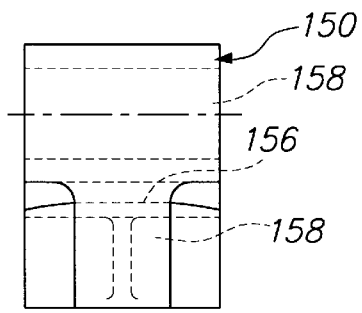
FIG. 5 is an inner side view of the dowel member depicted in FIG. 4.

Dowel members 150 are provided for maintaining alignment between the upper edges of the respective container sections. Each dowel member, also shown in FIGS. 4 and 5, includes an inverted L-shaped slot 152 which includes vertical and horizontal legs 154, 156, respectively. The horizontal leg 156 receives the horizontal flanges 42, 106, 72 of the front and intermediate container sections, and the vertical leg 154 receives portions of two adjacent side walls. It will be appreciated that the dowel member 150 is slidable along the respective container sections in a front to rear direction. In practice, both dowel members 150 are preferably installed onto the intermediate section 12I prior to interconnection of the hinges 110. Following the attachment of the three container sections by means of the hinges 110, the dowel members are slid to a position overlapping respective pairs of adjoining container sections, as depicted in FIG. 2.

Each dowel member 150 also includes a central channel 158 extending therethrough for admitting passage of a cable, as will be discussed.

The vertical sides of the carrier are not arranged in parallel when the container is assembled, but rather converge forwardly (i.e., to the right in FIG. 1). This facilitates a nesting of the sections when the carrier is in a collapsed state, as will be discussed in connection with FIG. 27.

Figures 16, 17:
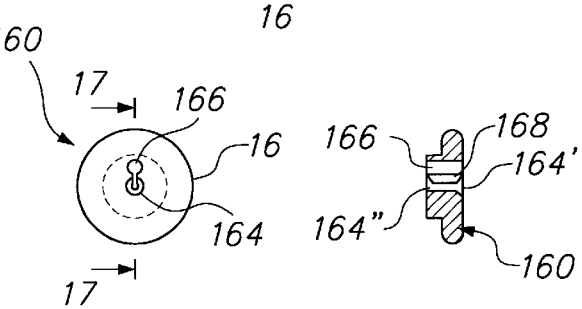
FIG. 16 is an end view of a disk portion of the anchoring member depicted in FIG. 15.
FIG. 17 is a sectional view taken along the line 17—17 in FIG. 16.
Figure 18:
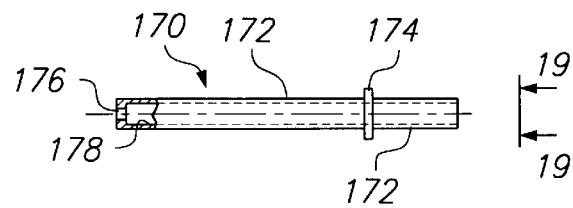
FIG. 18 is a side view of a tube component of a cable tensioning assembly with a portion thereof broken away.
Figure 12:
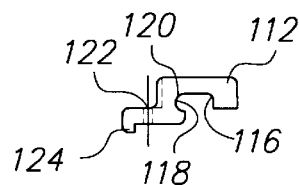
FIG. 12 is an end elevational view of the female hinge element depicted in FIG. 11.
Figure 14:
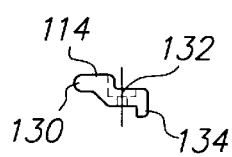
FIG. 14 is an end elevational view of the male hinge element depicted in FIG. 13.
Figure 19:
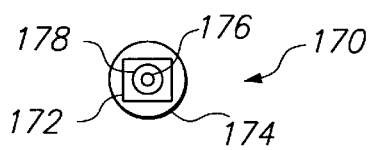
FIG. 19 is a view of the tube depicted in FIG. 18 in a direction taken according to the line 19—19 in FIG. 18.
Figure 20:
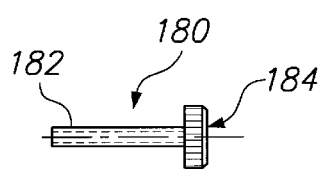
FIG. 20 is a side view of a cable tension actuator.

The cable arrangement 20 includes pairs of cable sections 20F, 20R disposed at respective sides of the carrier. Since each pair of cable sections is identically mounted, only one pair will now be described. The rear cable section 20R is anchored in the rear cable anchor 16 which is depicted in FIGS. 2 and 15–17. The anchor 16 comprises a hollow metal sleeve structure having a disk 160 disposed at one end thereof. A front portion 162 of the sleeve structure is of reduced diameter and makes a sliding fit within the hole 76 formed in the rear container section 12R. The sleeve structure may comprise a plurality of sleeves which are threaded together, or may comprise a single one-piece member. The disk 16 includes a central aperture 164 and an offset aperture 166 spaced radially therefrom. As can be seen in FIG. 17, a rear portion 164' of the aperture 164 is of about the same diameter as the aperture 166, whereas a front portion 164" of the aperture 164 is of reduced diameter. A radial slot 168 interconnects the apertures 164 and 166.

The diameter of the offset aperture 166 is large enough to permit passage therethrough of a bead 20B that is attached to the end of the rear cable section 20R (see FIG. 2). Then, the cable section can be displaced radially through the slot 168 and into the central aperture 164. The bead 20B can then come to rest within the larger rear section 164' of the central aperture 164 as shown in FIG. 2, whereby the cable section 20R is anchored.

Figure 25:
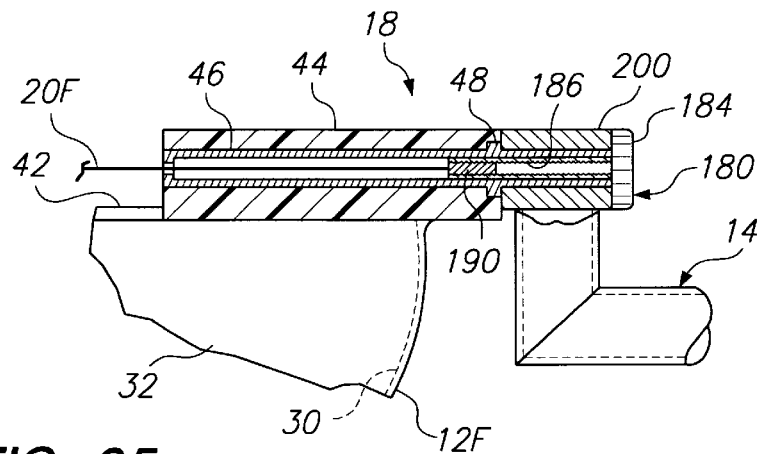
FIG. 25 is a fragmentary view of a front portion of the front container section, with a cable tensioning assembly thereof shown in longitudinal section.

The front cable section 20F is mounted in the front cable tensioner 18 which is shown in FIGS. 2, 18–20, and 25. The cable tensioner includes a hollow metal tube 170 having a non-circular (preferably square) outer periphery 172 and a flange 174 of enlarged cross section as compared to that of the outer periphery 172, the flange being located intermediate the ends of the tube. The rear end of the tube terminates in a square hole 176 which is of smaller cross section than an inner cylindrical bore 178 of the tube 170. When the tube 170 is mounted in the socket member 44, a front portion of the tube, i.e., the portion located in front of the flange 174, projects out of the socket member 44 to be mounted to one of the handles 14, as will be discussed. A metallic tension actuator 180 (see FIGS. 20 and 25) includes a hollow stem 182 having an annular outer periphery enabling the stem to be slidably mounted within a front end of the bore 178 of the tube 170. A manual rotating knob 184 of the tensioning actuator 180 remains outside of the tube 170 for manual rotation. An inner diameter of the stem 182 is provided with a female thread 186 as shown in FIG. 25. That thread receives a male thread formed on the exterior of a metal pin 190 that is swaged to a front end of the front cable section 20F.

The rear end of the front cable section 20F is joined to the front end of the rear cable section 20R by means of a suitable connector 192 shown in FIG. 2. The connector includes curved ends 194, each having a vertical slot therein capable of enabling a respective cable section to be slid downwardly therein. The ends of the cable sections 20F, 20R are affixed to beads 20B which retain the cable sections within the connector. It will be appreciated that any suitable type of cable connector could be utilized in lieu of the connector 192.

When the cable sections are joined by the connector 192, when the rear cable section is anchored within the rear anchor 16, when the front cable section 20F is mounted within the stem 182 of the tension actuator 180, it will be appreciated that rotation of the actuator 180 will cause the pin 190 to move axially with respect to the stem 182 to either increase or reduce cable tension, depending upon the direction of axial movement.

Figure 22:
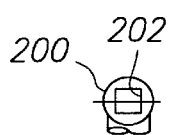
FIG. 22 is an end view of a mounting hub portion of the handle depicted in FIG. 21.
Figure 21:
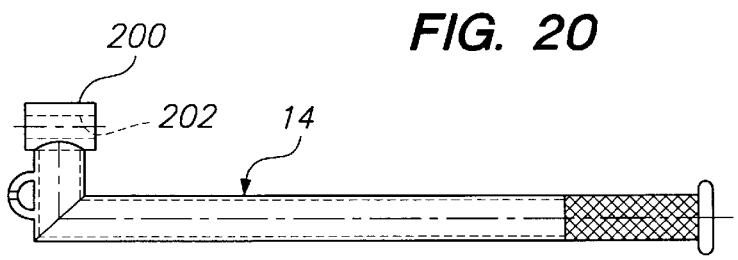
FIG. 21 is a plan view of a handle.

As noted earlier, each handle 14 is mounted on the exposed front portion of a tube 172. That is, each handle 14 includes a hollow mounting hub 200 which includes a central aperture 202 therethrough of square cross section correspondingly to the square outer periphery 172 of the tube 170 (see FIG. 22). Thus, when the mounting hub 200 is slidably inserted onto the tube 170, the handle is fixed against rotation. In addition, the handle can be mounted in various positions of adjustment, corresponding to the number of sides of the outer periphery 172. If desired, the handle could be reversed as shown in broken lines in FIG. 1 so as to extend rearwardly from the mounting hub 200.

It will be appreciated that although only one handle 14 is depicted in FIG. 1, there will be provided two mounting handles on respective sides of the carrier to enable a user to stand between and grip the two handles to raise the front end of the carrier. As the carrier 10 is being transported in that manner, the rear end of the carrier can be supported either directly on the underside of the rear container section 12R, or on wheels 210, depending upon the nature of the terrain on which the carrier is being transported. For example, it may be desirable to support the rear container section 12R directly on a snow or icy terrain, and support that container section on wheels when travelling on less slippery terrain such as soil or rock.

Figure 10:
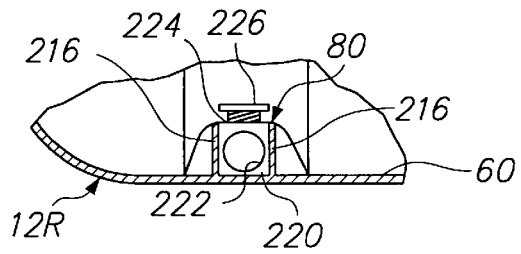
FIG. 10 is a cross-sectional view taken along the line 10—10 in FIG. 1.
Figure 15:
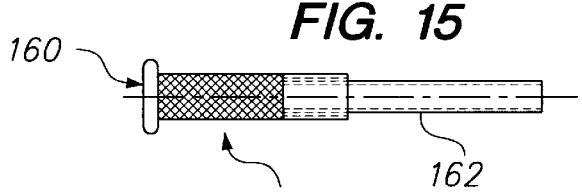
FIG. 15 is a side view of a cable anchoring member.
Figure 11:
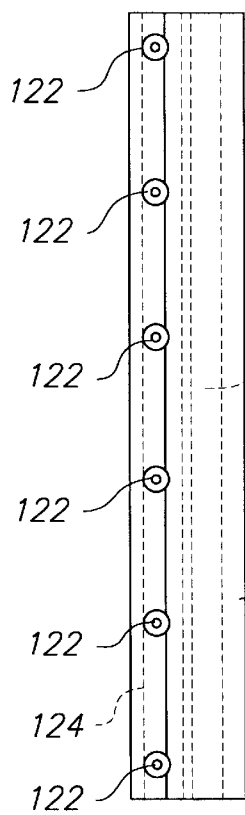
FIG. 11 is a top plan view of a female hinge element.
Figure 13:
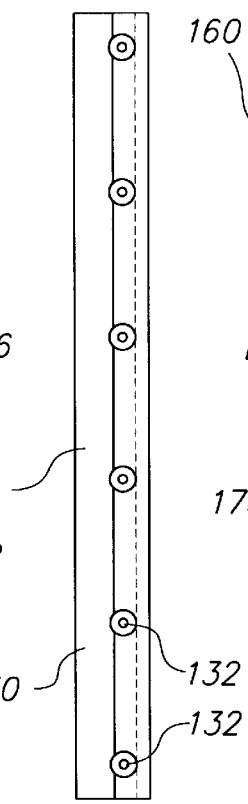
FIG. 13 is a top plan view of a male hinge element.
Figure 28:
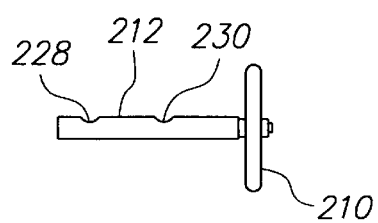
FIG. 28 is a side view of a wheel and axle assembly for use in the carrier.

Each wheel is removably mounted on an axle 212 as depicted in FIG. 28. The axle 212 has a circular outer periphery which fits into a circular hole 214 (see FIG. 2) formed in a respective side wall of the rear container section 12R. Extending transversely across the floor 60 of the rear container section 12R are a pair of upright flanges 216 (depicted in FIG. 10) forming a channel 218 which receives the axles. Situated at two places along the channel 218 are sockets 220 which contain holes 222 through which the respective axles project. Mounted in a roof 224 of each socket is a retainer screw 226 which is capable of vertical movement in response to being rotated. Each retaining screw 226 is adapted to be received within a selected one of a pair of recesses 228, 230 formed in each axle. In this way, it is possible to shift each axle between inwardly retracted and outwardly extended positions, depending upon which of the recesses 228, 230 receives the respective retaining screw 226. For example, if the retaining screws 226 are received in the recesses 230 of the axles 212, then the axles 212 will be retracted inwardly, but if the retaining screws 226 are received in the recesses 228, then the axles 212 will be extended. When the axles 212 are extended, the carrier can be made into a wheel-supported structure by attaching the wheels 210 to the axles for transport over hard terrain. For transport over slippery terrain, the carrier is converted into a sled by removing the wheels 210 and retracting the axles.

Figure 27:
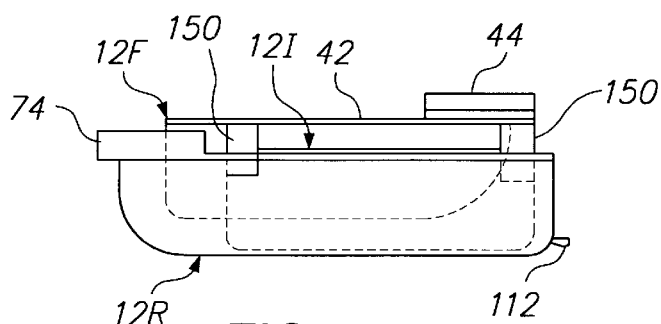
FIG. 27 is a side view of the container according to the present invention after it has been broken down and the components thereof nested together.

When not in use, the carrier 10 can be easily collapsed, and the container sections can be nested together as shown in FIG. 27. Collapsing of the carrier can be done without removing screws or bolts. That is, the cable sections of each pair can be disconnected from one another by sliding them from the slots of the connector 192; then the dowel members 150 can be slid horizontally along the horizontal flanges 42, 106, 72 of the container sections in order for each dowel member to be situated exclusively on only one of those sections. Then, the container sections can be rotated relative to one another about hinge axes defined by the nose 130 and pocket 118 of the hinge elements 114, 112. This enables the container sections to be separated from one another. Each of the handles 14 can be removed by rotating the respective actuator 180 sufficiently to disconnect itself from the pin 190 of the cable section 20F. Then the actuator 180 can be removed from the tube 170, enabling the handle 14 to be removed.

The loose components can be stored as depicted in FIG. 27. That is, the intermediate container section 12I can be nested within the rear container section 12R, and the front container section 12F can be partially nested within the intermediate section 12I and partially within the rear section 12R. The dowel members 150 could remain on the intermediate section 12I and serve as supports for the horizontal flange 42 of the front section 12F. This nesting is made possible by the tapering configuration of the carrier, since the rear section 12R is larger than the other two sections 12F, 12I.

The remaining components, e.g., the rear anchor 16 and the front tensioner 18, as well as the handles 14, wheels 210 and axles 212, can be stored in or between the nested container sections. The nested unit shown in FIG. 27 can then be inserted into a backpack or the like for convenient carrying.

In order to reassemble the unit, the hinge structures 110 of the container sections are connected together by inserting the male hinge element 114 into the female hinge element 112 in the direction D shown in FIG. 3, and then causing the section which carries the male hinge element to rotate relative to the other container section in the direction R. The dowel members 150, mounted on the intermediate container section 12I, are then slid horizontally until one of the dowel members overlaps the front and intermediate sections, and the other dowel member overlaps the rear and intermediate sections. This maintains the upper edges of the side walls of the container sections in alignment. Then, each handle 14 is mounted on the front projecting portion of a respective tube 170. The pin 190 to which the front end of the front cable section 20F is attached will already have been pulled through the front end of the tube and now projects from the front end of the tube and mounting hub. That pin is then threadedly inserted into the actuator 180, and the actuator is slid into the hole 178 of the tube 170. The rear end of each rear cable section is mounted in the respective tensioner 16 by inserting the bead 20B thereof axially through the large aperture 166 of the disk 160 and then sliding the cable downwardly through the slot 168 so that the bead 20B becomes nested within the rear section 164' of the aperture 164. The front end of each rear cable section 20R is connected to the rear end of a respective front cable section 20F by means of the connector 192.

The cable arrangement is then tensioned by rotating the actuators 180, causing the pins 190 to be displaced axially forwardly. The user can then step between the handles 14 and lift the handles to raise the carrier to an inclined posture shown in FIG. 26. The carrier would be transported by pulling on the handles 14. It will be appreciated that the force holding the handles onto the container section is provided by the cables which pull against the mounting hubs 200 through the actuators 180.

If a wheeled support of the carrier is desired, the axles of the wheels are inserted into respective openings 214 in the rear container section 12R until the recess 228 of each axle becomes aligned with the respective retaining screw 226. The retaining screws 226 are then screwed down so that they enter the recesses 228 to maintain the wheels 210 in laterally extended positions of adjustment.

It will be appreciated that in the present invention, the tensioning of the cables holds the container sections together, and prevents relative rotation of the container sections about axes defined by the hinges 110, thereby ensuring that the sections cannot become disconnected. Also, by compressing the container sections firmly together by means of the cable arrangement, the overall resistance of the container to vertical sheer forces is maximized. Therefore, even though the container sections are formed of a relatively light weight material, the carrier can support relatively high loads.

The cables themselves do not add substantial weight, and can be assembled and disassembled relatively easily. The metallic members can be formed of any suitably lightweight materials, such as aluminum. It will be appreciated that there is no need to perform a time consuming manipulation of screws and bolts in order to connect or disconnect the container sections, handles, cables, etc. Furthermore, despite the ability of the carrier to support relatively high loads, it can be quickly and easily broken down into a collapsed, nested condition for insertion into a knapsack or the like.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A collapsible, ground-supportable, manually transportable carrier, comprising:

a container formed by a plurality of container sections, each container section including a floor extending from one longitudinal end to another of its respective container section, and a pair of opposing side walls extending upwardly from said floor, said container sections arranged in end-to-end relationship so that said floors and side walls are contiguously arranged to form an upwardly open space; and a connecting structure interconnecting adjoining ones of said container sections and including:
  inter-fitting connector elements disposed on said floors of respective ones of said adjoining container sections, said inter-fitting connector elements being disengageable from one another upon relative movement between said adjoining container sections in a first direction, said inter-fitting elements comprising hinge elements forming a horizontal transverse pivot axis between said adjoining container sections
  a tensioned cable arrangement releasably connected to said container to apply a force to said container opposing said relative movement, and
  a cable tensioner connected to the cable arrangement for adjusting cable tension.

2. The carrier according to claim 1 wherein one of the container sections constitutes a rearmost container section and including an upright rear wall, an underside of said floor of rearmost container section defining a ground support structure joined to said upright rear wall by a curved transition section.

3. The carrier according to claim 1 wherein said relative movement for disengaging said hinge elements comprises relative pivotal movement about said pivot axis in a direction causing upper portions of said adjoining container sections to move away from one another, said tensioned cable arrangement extending in a longitudinally direction adjacent upper edges of respective side walls of said adjoining container sections.

4. The carrier according to claim 1 wherein one of said hinge elements forms a downwardly open recess, and the other of said hinge elements forms a projection sized to fit into said recess.

5. The carrier according to claim 4 wherein said recess and projection extend transversely across substantially the entire width of their respective container sections.

6. The carrier according to claim 4 wherein said recess includes a curved pocket at one horizontal end thereof sized to receive a curved end of said projection for constraining said hinge elements against relative movement except for relative pivotal movement about said axis in a direction causing upper portions of said adjoining container sections to move away from one another.

7. The carrier according to claim 1 wherein said side walls of each container section converge forwardly.

8. The carrier according to claim 1 wherein said floor of each of said adjoining container sections includes at least one reinforcing rib extending completely transversely thereacross such that said inter-fitting elements are disposed between the reinforcing ribs of the adjoining container sections.

9. The carrier according to claim 1 wherein there are at least three said container sections arranged end-to-end, two of said container sections constituting endmost container sections each including an upright end wall defining a longitudinal end of said space.

10. The carrier according to claim 9 wherein said cable arrangement comprises first and second cables disposed along respective sides of said carrier, the ends of each cable being attached to respective ones of said endmost container sections, said cable tensioner comprising a pair of longitudinally adjustable members disposed on one of said endmost container sections, one end of each cable being connected to a respective one of said longitudinally adjustable members.

11. The carrier according to claim 9 wherein said container sections are detachable from one another and configured to nest one inside of the other.

12. The carrier according to claim 11 wherein there are three said container sections comprised of two endmost container sections and one intermediate container section, one of said endmost container sections sized to nest within said intermediate container section, and said intermediate container section sized to nest within the other of said endmost container sections.

13. The carrier according to claim 9 further including removable carrying handles connectable to one of said endmost container sections, each handle being mountable in different orientations relative to said one endmost container section.

14. The carrier according to claim 1 wherein one of said container sections constitutes a rearmost container section and includes an upright rear wall, a pair of ground support wheels being mountable on opposite sides of said rearmost container section.

15. The carrier according to claim 14 wherein each of said wheels is mountable on a respective axle, each axle being shiftable in a transverse direction of said carrier between extended and retracted positions.

16. The carrier according to claim 15 wherein said rearmost container section includes a pair of sockets that are aligned with one another in a transverse direction of said carrier, said axles being slidable within respective ones of said sockets, each axle including a pair of recesses spaced apart along said axle, each socket including a fastener engageable with respective ones of said recesses.

17. A collapsible, ground-supportable, manually transportable carrier, comprising:
  a container formed by a plurality of container sections, each container section including a floor extending from one longitudinal end to another of its respective container section, and a pair of opposing side walls extending upwardly from said floor, said container sections arranged in end-to-end relationship so that said floors and side walls are contiguously arranged to form an upwardly open space; and
  a connecting structure interconnecting adjoining ones of said container sections and including:
    inter-fitting connector elements disposed on said floors of respective ones of said adjoining container sections, said inter-fitting connector elements being disengageable from one another upon relative movement between said adjoining container sections in a first direction,
    a tensioned cable arrangement releasably connected to said container to apply a force to said container opposing said relative movement,
    a cable tensioner connected to the cable arrangement for adjusting cable tension, and
    coupling elements interconnecting upper edges of contiguously arranged side walls of said adjoining container sections, each of said coupling elements including a through-hole through which said tensioned cable arrangement extends.

18. The carrier according to claim 17 wherein said inter-fitting elements comprise hinge elements forming a horizontal transverse pivot axis between said adjoining container sections.

19. A collapsible, ground-supportable, manually transportable carrier, comprising:
  a container formed by a plurality of container sections, each container section including a floor extending from one longitudinal end to another of its respective container section, and a pair of opposing side walls extending upwardly from said floor, said container sections arranged in end-to-end relationship so that said floors and side walls are contiguously arranged to form an upwardly open space, one of said container sections constituting a rearmost container section and including an upright rear wall, an underside of said floor of said rearmost container section defining a ground support structure joined to said upright rear wall by a convexly curved transition section, a connecting structure interconnecting adjoining ones of said container sections and including:

inter-fitting connector elements disposed on said floors of respective ones of said adjoining container sections, said inter-fitting connector elements being disengageable from one another upon relative movement between said adjoining container sections in a first direction, a tensioned cable arrangement releasably connected to said container to apply a force to said container opposing said relative movement, a cable tensioner connected to the cable arrangement for adjusting cable tension; and coupling elements interconnecting upper edges of contiguously arranged side walls of said adjoining container sections, each of said coupling elements including a through-hole through which said tensioned cable arrangement extends.

* * * * *